UNITED STATES PATENT OFFICE 2,680,115

SUBSTITUTED TERTIARY-AMINOALKYL CARBINOLS

Arlo Wayne Ruddy, Albany, N. Y., and Theodore J. Becker, deceased, late of Albany, N. Y., by Maurice L. Tainter, administrator, Albany, N. Y., assignors to Winthrop-Stearns Inc., New York, N. Y., a corporation of Delaware No Drawing. Application January 28, 1949, Serial No. 73,442

14 Claims. (Cl. 260—294.7)

This invention relates to basic compounds and their salts which are useful as antispasmodic agents. More particularly it relates to tertiary-aminoalkyl carbinols having the general structure

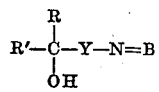

wherein R is an alkyl, cycloalkyl or heterocyclic radical, Y is an ethylene group which may be substituted with alkyl groups, R' is an aryl or cycloalkyl and —N=B is a secondary or tertiary amino radical; and to non-toxic salts thereof. This application is a continuation-in-part of the copending application of A. W. Ruddy and T. J. Becker, Serial Number 651,046, now abandoned.

The purpose of antispasmodic agents is to relieve spasms of the smooth muscles. These spasms may be caused (1) by exaggerated impulses from the autonomic nervous system which create violent contractions in the muscle or (2) stimulation of the muscle by chemical changes in the surrounding tissues. Atropine has the ability of relieving the first type of spasms, and its action is therefore known as "neurotropic." Papaverine counteracts spasms of the second type and hence its action is "musculotropic."

The compounds have been studied for their ability to reduce spasms in smooth muscle by barium chloride and acetylcholine in strips of rabbit ileum and by histamine in guinea pig ileum, and compared to atropine and papaverine for their neurotropic and musculotropic effects, respectively. These compounds have in general several times the musculotropic antispasmodic activity of papaverine without having increased toxicity over the latter. Furthermore, the compounds of this invention are characterized in general by moderate atropine-like action. However, they do not exhibit except to a very slight degree the often undesirable parasympathetic actions of atropine, such as mydriasis and central nervous system effects.

Compounds of the hereinabove disclosed formula, (R')(R)COH—Y—N=B, may be conveniently synthesized by treating a ketone of the general structure R'—CO—Y—N=B, wherein the substituents have the meanings disclosed hereinabove, with an organometallic complex such as a Grignard reagent or an arylsodium compound having the formula RM, where R has the meaning given above and M represents a metal such as sodium or lithium or a halogen-metal group such as bromomagnesium. Alternatively, the ketone may have the structure R—CO—Y—N=B and the organometallic compound the formula R'M.

The following equation illustrates a representative overall reaction, that between cyclohexyl-magnesium bromide and beta-dimethylaminobutyrophenone and subsequent hydrolysis of the intermediate complex which is formed:

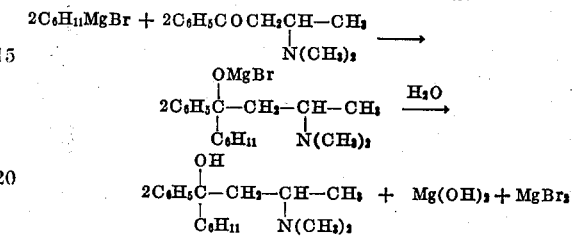

In the formulas above disclosed, R may represent cycloalkyl groups, such as cyclohexyl and cyclopentyl and simple hydrocarbon substituted products thereof; alkyl groups of at least three and preferably between three and six carbon atoms, such as propyl, isopropyl, butyl, isobutyl, amyl, isoamyl, sec-amyl, hexyl and isohexyl; and heterocyclic radicals such as thienyl, pyridyl, furyl, quinolyl and pyrryl. By heterocyclic in this sense we mean those groups having complete conjugate unsaturation and exhibiting aromatic properties. Y represents a two-carbon chain which may bear alkyl substituents, such as one or more methyl or ethyl radicals, on either or both carbon atoms of the chain. It includes alkylene chains of the type

where X represents hydrogen or lower alkyl radicals. Such alkylene radicals having the free valence bonds on adjacent carbon atoms only may be termed alpha, beta-alkylene radicals, alpha indicating one of the carbon atoms in the above formula and beta indicating the adjacent carbon atom. The term "alpha,beta" distinguishes alkylene radicals of the above type from those in which the free valence bonds are not on adjacent carbon atoms of the radicals. R' represents an aryl group, or a cycloalkyl group such as cyclopentyl or cyclohexyl. By an aryl group we mean an aromatic hydrocarbon group of one or two rings optionally bearing inert substituents such as halo, alkyl or alkoxy. Examples of such groups include phenyl, chlorophenyl, anisyl, xenyl, and naphthyl. The grouping —N=B represents an aliphatic amino group, including alkylamino, cycloalkylamino, dicycloalkylamino, and dialkylamino groups, the component organic groups being if desired of different structure. The grouping —N=B also may represent a cyclic amino grouping such as piperidyl, morpholinyl, pyrrolidyl, piperazyl, thiamorpholinyl, and the like. Such cyclic amino groups may be considered aliphatic heterocyclic amino radicals, since they do not have complete, conjugate unsaturation, and do not exhibit aromatic properties (Cf. Gilman, Organic Chemistry, 2nd edition, vol. I, pp. 126–127, 1943), and behave like simple aliphatic amines.

In the synthesis of amino alcohols of the type hereinabove shown from ketones having the general structure R'—CO—Y—N=B or

RCO—Y—N=B by reaction with an organometallic compound of the type RM or R'M respectively (the substituents having the meanings already given), the organometallic compound may be any of the usual forms which react with ketones to form tertiary alcohols. These types include the Grignard reagent, in which M stands for the group Mg-halogen; the alkyl- and aryl-sodium, -potassium or -lithium compounds, wherein M stands for Na, K, Li respectively; and related compounds. The amino ketones may be used as the free bases or as their salts, e. g., their hydrochlorides. When salts of the amino ketones are used, part of the organometallic compound is consumed by the acid, but this is not a serious disadvantage since an excess of the organometallic reagent is generally employed. Similarly, when the amino group —N=B contains a hydrogen atom some of the organometallic material is destroyed, but again with no great disadvantage.

The amino ketones, which are the starting materials for the preparation of the amino alcohols and the amines which constitute this invention, may be synthesized by a variety of methods well understood by those skilled in the art. A simple method is based on the Mannich reaction and is illustrated by the preparation of beta-(diethylamino)-isopropyl cyclohexyl ketone from ethyl cyclohexyl ketone, formaldehyde and diethylamine hydrochloride.

A second method involves use of the Friedel-Crafts reaction of beta-(tertiary-amino)-acyl halides with aromatic compounds by the method of Dalmer et al. (German Patent 629,054). For example, beta-dimethylaminobutyric acid [Decombe, Ann. chim. (10), 18, 145 (1932)] is converted by treatment with thionyl chloride to its acid chloride hydrochloride and the latter condensed with benezene in the presence of aluminum chloride to form beta-dimethylaminobutyrophenone. While the Dalmer method is suited only to the use of beta-(tertiary-amino)-acyl halides, beta-secondary-amino ketones may be obtained by this process by employing beta-(alkylbenzylamino)-acyl halides. After condensation with the aromatic compound by the Friedel-Crafts method, the resulting beta-alkylbenzylamino ketone is debenzylated according to known procedures (such as catalytic hydrogenolysis) to the corresponding beta-alkylamino ketone. The debenzylation may, however, be deferred until after the amino ketone is reacted with the organometallic compound R$_2$M and the tertiary alcohol formed.

A third synthetic approach utilizes the addition of amines to alpha,beta-unsaturated ketones, forming beta-amino ketones. An example of this process is the addition of piperidine to crotonophenone to form beta-piperidylbutyrophenone.

When used as pharmacological agents, these compounds are ordinarily used in the form of water-soluble salts, acid-addition salts derived from inorganic or organic acids, or quaternaries derived from alkyl or aralkyl esters of inorganic acids or of certain strong organic acids such as sulfonic acids, the anions of which are non-toxic and otherwise innocuous to the animal organism at the dosage levels required for therapeutic results. Examples of such salt forming substances include hydrochloric acid, hydrobromic acid, hydriodic acid, sulfuric acid, citric acid, tartaric acid, lactic acid, sulfamic acid, ethanesulfonic acid, methyl chloride, ethyl bromide, methyl iodide, propyl iodide, benzyl chloride, methyl sulfate, methyl p-toluenesulfonate, etc.

The following examples will illustrate this invention more fully but should not be construed as a limitation thereto.

EXAMPLE 1

*1-phenyl-1-cyclohexyl-2-methyl-3-(N-piperidyl)-1-propanol*

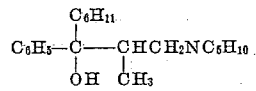

To a cold solution of cyclohexylmagnesium bromide, prepared from 193 g. (1.186 moles) of cyclohexyl bromide, 32.2 g. (1.326 moles) of magnesium and 600 cc. of anhydrous ether, was added in one and one-half hours at 0° C. 111 g. (0.479 mole) of alpha-(piperidylmethyl)-propiophenone in 380 cc. of dry benzene. After the addition, the reaction mixture was warmed to 73° C. while the ether was removed by distillation over a period of two and one-half hours, and then added to ice containing 170 cc. of concentrated hydrochloric acid. Ammonium chloride (100 g.) and 350 cc. of 28% ammonium hydroxide were added and the organic layer was separated. The aqueous layer was extracted with ether and the combined extracts were dried with anhydrous sodium sulfate. The solvent was removed and the residue distilled in vacuo. The base distilled at 180–195° C. (1 mm.) and solidified in the receiver. Recrystallization from methanol yielded 133 g. of base having M. P. 116–117° C.

The hydrochloride was formed by adding dry ether to an absolute alcoholic solution of the base containing excess hydrogen chloride and melted at 259° C. with decomposition.

*Anal.*—Calcd. for C$_{21}$H$_{34}$ONCl: Cl, 10.07; N, 3.98. Found: Cl, 10.12; N, 4.08.

EXAMPLE 2

*1-phenyl-1-cyclohexyl-2-(N-piperidyl-methyl)-1-butanol*

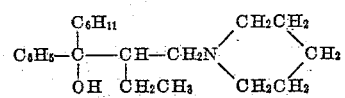

was prepared according to the method of Example 1, part (a) starting with 115.2 g. of alpha-(N-piperidylmethyl)-butyrophenone, B. P. 124–126° C. (1 mm.), and 189 g. of cyclohexyl bromide. The free base had the B. P. 175–185° C. (1 mm.) and the M. P. 86–87° C.

Its hydrochloride had the M. P. 237–238.5° C. *Anal.*—Calcd. for $C_{22}H_{36}ONCl$: C, 72.20; H, 9.92; N, 3.83. Found: C, 72.20; H, 10.23; N, 4.09.

EXAMPLE 3

*1-phenyl-1-cyclohexyl-3-(N-piperidyl)-1-propanol*

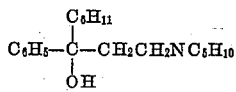

Phenyl magnesium bromide was prepared from 48.5 g. (0.308 mole) of bromobenzene, 7 g. (0.29 mole) of magnesium, and 125 ml. of dry ether. To it was added at 5° C. over a period of one-half hour 40 g. (0.18 m.) of cyclohexyl beta-(N-piperidyl)-ethyl ketone (boiling point 115–117° C./1 mm.) in 125 ml. of dry ether. The mixture was allowed slowly to come to room temperature, refluxed for one hour, and then poured into ice containing 80 ml. of concentrated hydrochloric acid. Ammonium chloride (100 g.) and 200 ml. of concentrated ammonium hydroxide were added and the organic layer was separated. After drying and removing the solvent, the residue was distilled under reduced pressure. The base distilled at 158–170° C. (1 mm.) and solidified. Upon recrystallization from methanol it melted at 112–113° C.

In the above example, 1-phenyl-1-cyclohexyl-3-(N-piperidyl)-1-propanol can also be prepared by reacting cyclohexyl beta-(N-piperidyl)-ethyl ketone with phenylsodium in toluene and working up the product as above.

Its hydrochloride had the M. P. 242–243° C. *Anal.*—Calcd. for $C_{20}H_{32}ONCl$: Cl, 10.49. Found: Cl, 10.47.

Its methiodide was prepared by heating a mixture of 18.8 g. of the free base and 15 g. of methyl iodide in benzene solution until the reaction was complete. After filtration of the product and recrystallization from an alcohol-ether mixture, 25.6 g. of the methiodide of 1-phenyl-1-cyclohexyl-3-(N-piperidyl)-1-propanol was obtained, M. P. 204.5–206.5° C.

*Anal.*—Calcd. for $C_{21}H_{34}ONI$: C, 56.88; H, 7.73; N, 3.16. Found: C, 57.02; H, 7.61; N, 3.12.

EXAMPLE 4

*1-phenyl-1-(2'-thienyl)-2-methyl-3-(N-piperidyl)-1-propanol*

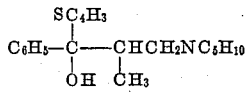

A solution of 47.6 g. (0.2 mole) of alpha-(N-piperidyl)-methyl-2-propiothienone (boiling point 120–125° C./1mm.; prepared from 2-propiothienone, formaldehyde, and piperidine by the Mannich reaction) in 200 ml. of dry benzene was added over a period of 50 minutes to a cold (0° C.) ether solution of phenylmagnesium bromide, prepared from 13.4 g. (0.55 mole) of magnesium, 78.5 g. (0.5 mole) of bromobenzene, and 300 ml. of dry ether. The reaction mixture was warmed to 72° C. and the ether removed by distillation. The remaining mixture was poured into ice containing 75 ml. of concentrated hydrochloric acid. To this was added 80 g. of ammonium chloride followed by 150 ml. of 28% ammonium hydroxide. The organic layer was separated and the aqueous layer was extracted with ether. The combined extracts were washed, dried, and evaporated. The residue, which was almost entirely the pure base, was readily crystallized. It also recrystallized from methanol and melted at 103.5–104° C.; yield, 46.1 g.

Its hydrochloride melted at 175.5–176° C. *Anal.*—Calcd. for $C_{19}H_{26}ONClS$: S, 9.11; Cl, 10.07. Found: S, 9.13; Cl, 10.27.

EXAMPLE 5

*1-(2'-thienyl)-1-cyclohexyl-2-methyl-3-diethylamino-1-propanol*

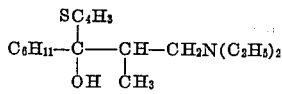

was prepared by treating 45 g. (0.2 mole) of alpha-(diethylaminomethyl)-2-propiothienone (boiling point 105–110° C./1 mm.) with the Grignard reagent from 13.4 g. (0.55 mole) of magnesium turnings, 81.5 g. (0.5 mole) of cyclohexyl bromide and 300 ml. of absolute ether. It distilled at 141–144° C. (1 mm.) and had $n_D^{25}$=1.5200–1.5225.

Its hydrochloride melted at 178.5–180° C.

In a similar manner 1-phenyl-1-cyclohexyl-3-dimethylamino-1-propanol hydrochloride was prepared. It melted at 212–213° C. after recrystallization from absolute alcohol diluted with dry ether and contained 11.91% of chlorine (calcd., 11.90%). 1-phenyl-1-cyclohexyl-3-dibutylamino-1-propanol hydrochloride was similarly made. It also recrystallized with difficulty and melted at 86–94° C. after several recrystallizations from dilute alcohol.

EXAMPLE 6

*1-phenyl-1-cyclohexyl-2-dimethylaminomethyl-1-butanol*

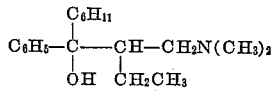

was prepared by a method similar to that described in Example 1. The reaction of 51.3 g. of alpha-dimethylaminomethylbutyrophenone and the Grignard reagent prepared from 97.8 g. of cyclohexyl bromide and 14.6 g. of magnesium gave 66.6 g. (92%) of the free base, boiling point 139–144° C. (1 mm.). This product solidified and when recrystallized from methanol gave 54.7 g. of 1-phenyl-1-cyclohexyl-2-dimethylaminomethyl-1-butanol, melting point 70.5–71° C.

When 23.2 g. of the free base was treated with alcoholic hydrogen chloride, 24.8 g. of hydrochloride was obtained, melting point 247–248° C.

*Anal.*—Calcd. for $C_{19}H_{32}ONCl$: N, 4.27; Cl, 10.88. Found: N, 4.15; Cl, 10.64.

EXAMPLE 7

*1-phenyl-1-cyclohexyl-2-methyl-3-dimethylamino-1-propanol*

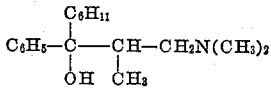

was prepared by a method similar to that described in Example 1. The reaction of 47.8 g. of alpha-dimethylaminomethylpropiophenone and the Grignard reagent prepared from 97.8 g. of cyclohexyl bromide and 14.6 g. of magnesium gave 52 g. (75%) of the free base, melting point 105–106° C.

Its hydrochloride had the melting point 253.5–254.5° C.

*Anal.*—Calcd. for $C_{18}H_{30}ONCl$: N, 4.49; Cl, 11.37. Found: N, 4.38; Cl, 11.24.

EXAMPLE 8

*1-phenyl-1-cyclohexyl-2-methyl-3-diethylamino-1-propanol*

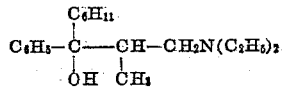

was prepared by a method similar to that described in Example 1. The reaction of 41.0 g. of alpha-diethylaminomethylpropiophenone and the Grignard reagent prepared from 97.8 g. of cyclohexyl bromide and 14.6 g. of magnesium gave 50.9 g. of the free base, boiling point 143–154° C. (1 mm.). The product solidified and when recrystallized from methanol gave a pure sample of 1-phenyl-1-cyclohexyl-2-methyl-3-diethylamino-1-propanol, melting point 57–57.5° C.

Its hydrochloride had the melting point 141–142° C.

*Anal.*—Calcd. for $C_{20}H_{34}ONCl$: N, 4.12; Cl, 10.43. Found: N, 4.08; Cl, 10.32.

EXAMPLE 9

*1-phenyl-1-cyclohexyl-2-diethylaminomethyl-1-butanol*

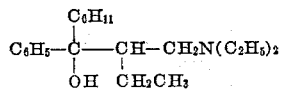

was prepared by a method similar to that described in Example 1. The reaction of 58 g. of alpha-diethylaminomethylbutyrophenone and the Grignard reagent prepared from 97.8 g. of cyclohexyl bromide and 14.6 g. of magnesium gave 73.7 g. (93%) of the free base, boiling point 152–162° C. (1 mm.). The product solidified and when recrystallized from 80% methanol, gave a pure sample of 1-phenyl-1-cyclohexyl-2-diethylaminomethyl-1-butanol, melting point 56–57° C.

Its hydrochloride had the melting point 206–207° C.

*Anal.*—Calcd. for $C_{21}H_{36}ONCl$: N, 3.96; Cl, 10.02. Found: N, 3.79; Cl, 9.86.

EXAMPLE 10

*1-(n-hexyl)-1-phenyl-3-(N-piperidyl)-1-propanol*

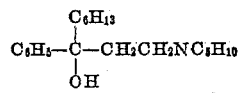

was prepared by a method similar to that described in Example 1. The reaction of 127 g. of beta-(N-piperidyl)-propiophenone hydrochloride and the Grignard reagent prepared from 289 g. of n-hexyl bromide and 42.5 g. of magnesium gave 112.7 g. (75%) of the free base, melting point 66–68° C.

Its hydrochloride had the melting point 214–215° C.

*Anal.*—Calcd. for $C_{20}H_{34}ONCl$: N, 4.12; Cl, 10.43. Found: N, 4.23; Cl, 10.25.

EXAMPLE 11

*1-phenyl-1-isopropyl-3-(N-piperidyl)-1-propanol*

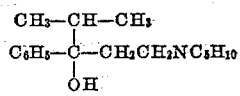

was prepared by a method similar to that described in Example 1. The reaction of 127 g. of beta-(N-piperidyl)-propiophenone hydrochloride and the Grignard reagent prepared from 215 g. of isopropyl bromide and 42.5 g. of magnesium produced the free base with the melting point 75–76° C.

Its hydrochloride had the melting point 189–190° C.

*Anal.*—Calcd. for $C_{17}H_{28}ONCl$: C, 68.54; H, 9.47; N, 4.70; Cl, 11.90. Found: C, 68.37; H, 9.28; N, 4.65; Cl, 11.88.

EXAMPLE 12

*5-methyl-3-phenyl-1-(N-piperidyl)-3-hexanol*

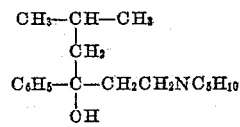

was prepared by a method similar to that described in Example 1. The reaction of 127 g. of beta-(N-piperidyl)-propiophenone hydrochloride and the Grignard reagent prepared from 240 g. of isobutyl bromide and 42.5 g. of magnesium gave a sample of the free base melting at 59–60° C.

Its hydrochloride when recrystallized from an ether-alcohol mixture melted at 229–231° C.

*Anal.*—Calcd. for $C_{18}H_{30}ONCl$: C, 69.37; H, 9.70; Cl, 11.37. Found: C, 69.40; H, 9.52; Cl, 11.22.

Its methiodide, prepared in the usual way from the free base and methyl iodide in dry benzene, had the melting point 194–195.5° C. when recrystallized from an ethyl acetate-methanol mixture.

*Anal.*—Calcd. for $C_{19}H_{32}ONI$: C, 54.67; H, 7.73; I, 30.41. Found: C, 54.69; H, 7.50; I, 30.73.

What is claimed is:

1. An acid addition salt of a compound of the formula

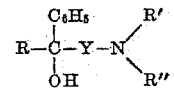

wherein R is a 5-6-membered cycloalkyl group, Y is a lower alpha,beta-alkylene radical and R' and R'' are lower alkyl groups.

2. An acid addition salt of a compound of the formula

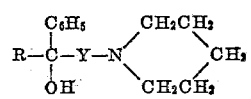

wherein R is a 5-6-membered cycloalkyl group and Y is a lower alpha,beta-alkylene radical.

3. The process of preparing a compound of the formula

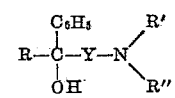

wherein R is a 5-6-membered cycloalkyl group, Y is a lower alpha,beta-alkylene radical and R' and R'' are lower alkyl groups, which comprises reacting a ketone having the formula

ZCO—Y—NR'R'' with an organometallic compound having the formula Z'MgHal where Z and Z' are different members of the group consisting of phenyl and R, and Hal is halogen; and hydrolyzing the resultant complex.

4. The process of preparing a compound of the formula

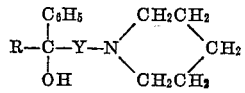

wherein R is a 5-6-membered cycloalkyl group and Y is a lower alpha,beta-alkylene radical, which comprises reacting a ketone having the formula

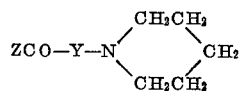

with an organometallic compound having the formula Z'MgHal where Z and Z' are different members of the group consisting of phenyl and R, and Hal is halogen; and hydrolyzing the resultant complex.

5. The process of preparing 1-phenyl-1-cyclohexyl-3-(N-piperidyl)-1-propanol having the formula

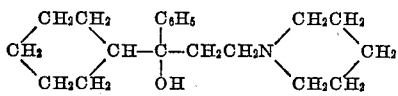

which comprises reacting a ketone having the formula

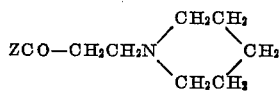

with an organometallic compound having the formula Z'Mg-Hal where Z and Z' are different members of the group consisting of phenyl and cyclohexyl and Hal is halogen, and hydrolyzing the resultant complex.

6. The process of preparing 1-phenyl-1-cyclohexyl - 3 - (N - piperidyl) - 1 - propanol having the formula

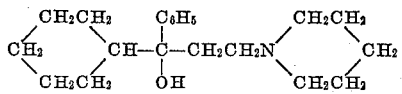

which comprises reacting cyclohexyl beta-(N-piperidyl)ethyl ketone with phenylmagnesium bromide, and hydrolyzing the resultant complex.

7. A member of the group consisting of: compounds of the formula

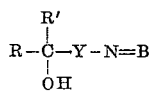

wherein R is a member of the group consisting of cyclopentyl and cyclohexyl radicals, R' is a member of the group consisting of cyclopentyl and cyclohexyl radicals and aryl radicals of benzene, naphthalene and biphenyl, Y is a lower alkylene radical wherein two carbon atoms separate the nitrogen from the carbon atom bearing the —OH group, —N=B is an amino radical selected from the group consisting of lower-dialkylamino, piperidino, morpholino and pyrrolidino radicals; and acid addition salts thereof.

8. The process for preparing a compound of the formula

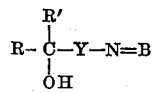

wherein R is a member of the group consisting of cyclopentyl and cyclohexyl radicals, R' is a member of the group consisting of cyclopentyl and cyclohexyl radicals and aryl radicals of benzene, naphthalene and biphenyl, Y is a lower alkylene radical wherein two carbon atoms separate the nitrogen from the carbon atom bearing the —OH group, and —N=B is an amino radical selected from the group consisting of lower-dialkylamino, piperidino, morpholino and pyrrolidino radicals, which comprises reacting a ketone having the formula ZCO—Y—N=B with an organometallic compound having the formula Z'M where Z and Z' are different members of the group consisting of R and R' and M is a member of the group consisting of alkali metals and halo-magnesium, and hydrolyzing the resultant complex.

9. 1 - phenyl - 1 - cyclohexyl - 3 - (N - piperidyl-1-propanol having the formula

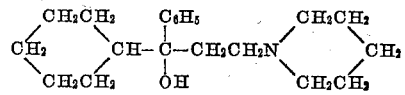

10. The hydrochloride of 1-phenyl-1-cyclohexyl - 3 - (N - piperidyl) - 1 - propanol having the formula

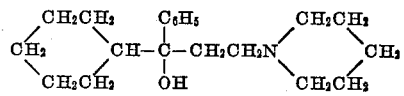

11. A compound of the group consisting of tertiary amino-alcohols of the formula

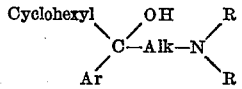

wherein Ar is a member of the group consisting of phenyl, naphthyl and biphenyl, Alk is a lower alphat,beta alkylene radical and

is a lower dialkylamino group and acid addition salts thereof.

12. A compound of the group consisting of tertiary amino-alcohols of the formula

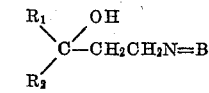

wherein $R_1$ is a cycloalkyl of the group consisting of cyclopentyl and cyclohexyl, $R_2$ is a benzene radical and N=B is a member of the group consisting of lower dialkylamino, piperidino and morpholino and acid addition salts thereof.

13. 1 - phenyl - 1 - cyclohexyl - 3 - (1 - piperidino)-propanol-1 methiodide.

14. An acid addition salt of 1-phenyl-1-cyclohexyl - 3 - (N - piperidino) - 1 - propanol having the formula

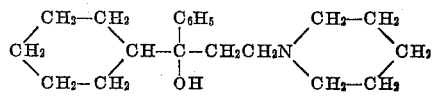

(References on following page)

References Cited in the file of this patent

UNITED STATES PATENTS

| Number | Name | Date |
|---|---|---|
| 828,846 | Forneau | Aug. 14, 1906 |
| 1,978,539 | Klarrer et al. | Oct. 30, 1934 |
| 2,282,907 | Ter Horst | May 12, 1942 |
| 2,367,702 | Van Zoren | Jan. 23, 1945 |
| 2,411,664 | Miescher et al. | Nov. 26, 1946 |
| 2,441,069 | Hoffman et al. | May 4, 1948 |
| 2,443,206 | Suter | June 15, 1948 |

FOREIGN PATENTS

| Number | Country | Date |
|---|---|---|
| 883,539 | France | July 7, 1943 |

OTHER REFERENCES

Burger et al., J. Am. Chem. Soc., vol. 67 (1945), pp. 566–9.

Weizmann et al., Chem. Abstr., vol. 30 (1936), page 4814.

Mannich et al., Ber der Deu. Chem., vol. 55 (1922), page 358.